United States Patent
Morganti et al.

(10) Patent No.: US 6,381,955 B1
(45) Date of Patent: May 7, 2002

(54) METHOD AND SYSTEM FOR PROVIDING ELECTRICITY FROM AN INTEGRATED STARTER-ALTERNATOR TO AN ELECTRICALLY HEATED CATALYST

(75) Inventors: Carl Rudolph Morganti, Farmington Hills; James J. Klocinski, Saline; Ning Liu, Novi, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/778,639

(22) Filed: Feb. 7, 2001

(51) Int. Cl.[7] .................................................. F01N 3/10
(52) U.S. Cl. ............................. 60/300; 60/274; 60/286; 60/303
(58) Field of Search ..................... 60/300, 284, 303, 60/285, 274

(56) References Cited

U.S. PATENT DOCUMENTS

| | | | |
|---|---|---|---|
| 5,327,991 A | | 7/1994 | Yoshida |
| 5,390,493 A | * | 2/1995 | Fujishita et al. ............... 60/284 |
| 5,503,804 A | * | 4/1996 | Fujishita et al. ............ 422/109 |
| 5,512,789 A | * | 4/1996 | Lyon ......................... 307/10.1 |
| 5,732,550 A | * | 3/1998 | Muramatsu et al. .......... 60/274 |
| 5,822,983 A | | 10/1998 | Ikeda |
| 5,966,931 A | * | 10/1999 | Yoshizaki et al. ............ 60/284 |
| 6,003,304 A | * | 12/1999 | Swanson et al. .............. 60/274 |
| 6,052,988 A | | 4/2000 | Ikeda |
| 6,079,204 A | * | 6/2000 | Sun et al. ...................... 60/274 |

* cited by examiner

Primary Examiner—Thomas Denion
Assistant Examiner—Binh Tran
(74) Attorney, Agent, or Firm—John E. Kajander

(57) ABSTRACT

A method and system for distributing electrical energy from an integrated starter-alternator during a deceleration or overrun vehicle condition to an electrically heated catalyst in order to maintain the temperature of the electrically heated catalyst within an operating temperature range during the deceleration or overrun vehicle condition.

10 Claims, 1 Drawing Sheet

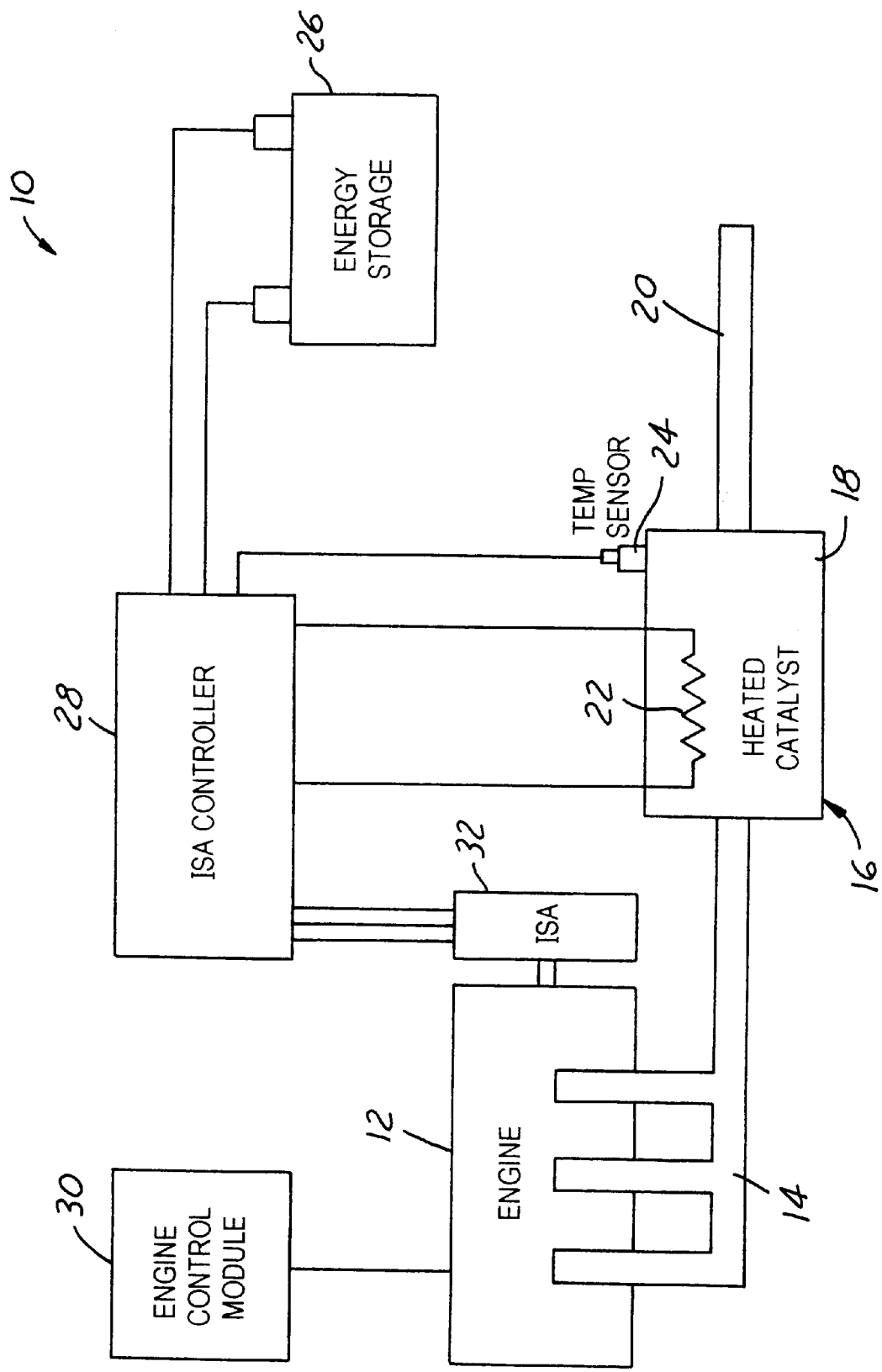

METHOD AND SYSTEM FOR PROVIDING ELECTRICITY FROM AN INTEGRATED STARTER-ALTERNATOR TO AN ELECTRICALLY HEATED CATALYST

TECHNICAL FIELD

The present invention relates generally to internal combustion engines operable for discharging exhaust gas to electrically heated catalysts and, more particularly, to a method and system for distributing electrical energy from an integrated starter-alternator during a deceleration or overrun vehicle condition to an electrically heated catalyst in order to maintain the temperature of the electrically heated catalyst within an operating temperature range.

BACKGROUND ART

For a typical vehicle powered by a sparked ignited internal combustion engine, two of the most difficult operating conditions for controlling exhaust emissions are deceleration and overrun. During vehicle deceleration, the engine is producing very little power and is being partly motored by the vehicle. "Overrun" is an expression that also describes a deceleration condition, but additionally may describe a condition where a vehicle is coasting down a sustained downgrade with the engine being partly motored by the vehicle.

Herein, "overrun" will be used to include the deceleration condition. In either case, the engine load is very light and the percentage of internal exhaust gas re-circulation (EGR) is high. Both of these factors contribute to marginal combustion stability. This results in high engine out hydrocarbon (HC) emissions and cool exhaust gas temperatures. The low exhaust gas temperatures are particularly a problem for the catalyst which are often not hot enough to keep the catalyst active. The engine calibrator is faced with either of two options each of which has its own drawbacks.

The first option is to leave the fuel injection enabled during the overrun. In this case the cool exhaust temperature will cool the catalyst causing it to become inefficient or even inactive. This allows hydrocarbons to accumulate in the catalyst or exit the tailpipe untreated. This problem is exacerbated by combustion stability being marginal under this condition. Hence, the engine out HC emissions tend to be exceptionally high. Once the engine comes back under load after a sustained overrun condition, the catalyst must be heated by the hot exhaust gas for the catalyst to become active and efficient again. Until that happens, untreated hydrocarbons will leave the tailpipe. In addition, the unburned hydrocarbons which accumulated in the catalyst during the overrun can create a run away thermal reaction once the engine comes under load again. This can either shorten the life of the catalyst or destroy the catalyst.

Another compromise with this option is that spark advance is typically retarded during an overrun condition. This is an attempt to keep the catalyst hot by initiating combustion late thereby increasing exhaust gas temperature. However, this compromises combustion efficiency and increases fuel consumption.

The second option is to disable the fuel injection during the overrun condition. This prevents unburned hydrocarbons from accumulating in the catalyst. However, the engine is now being motored completely by the vehicle and pumps cool ambient air through the catalyst which cools the catalyst. When the vehicle comes off of the overrun condition and the fuel injection is enabled again, the catalyst temperature may be close to ambient and will have to be reheated a great amount before becoming active again. During this time interval when the catalyst is warming up large amounts of untreated hydrocarbons may escape out of the tailpipe.

Accordingly, what is needed is a method and system operable with an electrically heated catalyst for addressing problems which occur in achieving low exhaust emissions and low fuel consumption when a vehicle goes into a sustained deceleration or overrun operating condition.

DISCLOSURE OF INVENTION

An object of the present invention is to provide a method and system for distributing electrical energy from an integrated starter-alternator during a deceleration or overrun vehicle condition to an electrically heated catalyst in order to maintain the temperature of the electrically heated catalyst within an operating temperature range.

In accordance with the object and other objects, the present invention provides an exhaust system for a motor vehicle having an internal combustion engine. The exhaust system includes an electrically heated catalyst operable for cleaning exhaust gas discharged by the internal combustion engine when the temperature of the electrically heated catalyst is in an operating temperature range. The exhaust system further includes a catalyst heater which converts electrical energy into heat. An integral starter-alternator converts mechanical energy generated by the internal combustion engine into electrical energy. The electrical energy from the integral starter-alternator is supplied to the catalyst heater during vehicle overrun. The catalyst heater uses the electrical energy to heat the electrically heated catalyst in order to maintain the temperature of the electrically heated catalyst in the operating temperature range during vehicle overrun.

Further, in accordance with the object and other objects, the present invention also provides a method for cleaning exhaust gas generated by an internal combustion engine of a motor vehicle during vehicle overrun. The method includes cleaning exhaust gas discharged by the internal combustion engine with an electrically heated catalyst when the temperature of the electrically heated catalyst is in an operating temperature range. An integral starter-alternator is then used to convert mechanical energy generated by the internal combustion engine and kinetic energy of motion of the vehicle into electrical energy. The electrical energy from the integral starter-alternator is then converted into heat by the electrically heated catalyst in order to maintain the temperature of the electrically heated catalyst in the operating temperature range during vehicle overrun.

There are numerous advantages associated with the present invention. As well as contributing a minor amount of braking action, the present invention helps the catalyst maintain its temperature and remain active and efficient. This eliminates the need to consider the second option described above where fuel is disabled during the overrun with its associated emission penalties. The present invention also eliminates the drawbacks associated with the first option because electrical heating of the catalyst during an overrun condition allows the catalyst to remain active and efficient.

BRIEF DESCRIPTION OF DRAWINGS

The FIGURE illustrates a block diagram of a system for distributing electrical energy from an integrated starter-alternator during a deceleration or overrun vehicle condition to an electrically heated catalyst in accordance with the method of the present invention.

BEST MODE FOR CARRYING OUT THE INVENTION

Referring now to the FIGURE, a block diagram of a system 10 for distributing electrical energy from an integrated starter-alternator during a motor vehicle deceleration or overrun condition to an electrically heated catalyst in accordance with the method of the present invention is shown. In general, the integrated starter-alternator distributes electrical energy to the electrically heated catalyst during vehicle deceleration or overrun in order to maintain the temperature of the electrically heated catalyst within an operating temperature range during the vehicle deceleration or overrun.

System 10 is incorporated into a vehicle having an internal combustion engine 12. Generally, engine 12 intakes an air/fuel mixture into a combustion cylinder, ignites the air/fuel mixture with a spark plug to produce combustion, and then passes exhaust gas resulting from the combustion into an exhaust manifold 14. Exhaust manifold 14 then passes the exhaust gas to a catalytic converter 16.

Catalytic converter 16 cleans the exhaust gas and passes the cleaned exhaust gas to a tailpipe 20 for discharge. Catalytic converter 16 includes an electrically heated catalyst 18. Electrically heated catalyst 18 carries an oxidizing catalyst for cleaning the exhaust gas. Electrically heated catalyst 18 could also be a three way catalyst. In order to operate properly, catalytic converter 16 and electrically heated catalyst 22 need to be maintained at a sufficient operating temperature such as at least 600° C. During normal vehicle operation, the temperature of the exhaust gas is hot enough to maintain the operating temperatures of catalytic converter 16 and electrically heated catalyst 18.

However, during certain operating conditions such as start up of engine 12 and vehicle deceleration and overrun, the temperature of the exhaust gas is not hot enough to heat catalytic converter 16 and electrically heated catalyst 18 for these devices to function properly. To this end, electrically heated catalyst 18 is associated with an electrical catalyst heater 22. Catalyst heater 22 generates heat in response to receiving electrical energy. Catalyst heater 22 provides the heat to electrically heated catalyst 18 in order to activate the oxidizing catalyst and promote the removal of hydrocarbons. Electrically heated catalyst 18 is activated when its temperature is maintained within the operating temperature range.

A temperature sensor 24 measures the temperature of electrically heated catalyst 18. Temperature sensor 24 may be a device that directly measures the temperature of electrically heated catalyst 18 or may infer this temperature from other parameters. In any event, temperature sensor 24 generates a temperature signal indicative of the temperature of electrically heated catalyst 18.

System 10 further includes an energy storage device 26 such as a battery and/or capacitors for supplying electrical energy to operate system 10. Battery 26 provides electrical energy to an integral starter-alternator (ISA) inverter controller 28. ISA inverter controller 28 supplies electrical power from battery 26 to an engine control module (ECM) 30 for powering the ECM. ECM 30 is operable with engine 12 to control the engine in response to various sensor inputs. Such control may include controlling the air/fuel mixture injected into the engine cylinders, the timing of the air/fuel injection, and the opening and closing of the intake and exhaust valves of the engine cylinders, and other engine functions.

ISA inverter controller 28 also supplies electrical power from battery 26 to an integrated starter-alternator (ISA) 32. ISA 32 is an electromagnetic device that uses the electrical power from battery 26 to turn over or start engine 12. ISA 32 also converts the mechanical energy supplied by engine 12 while running into electrical energy. ISA 32 transfers the converted electrical energy back to ISA controller 28. ISA inverter controller 28 may then transfer the converted electrical energy to battery 26 to recharge the battery. As will be explained in detail below, ISA inverter controller 28 transfers converted electrical energy to catalyst heater 22. During the process of ISA inverter controller 28 transferring the converted electrical energy to catalyst heater 22, ISA 32 accomplishes some braking affect on the vehicle.

During normal operation of the vehicle, the heat of exhaust gas from engine 12 maintains the temperature of electrically heated catalyst 18 within its normal operating range. A problem with maintaining the temperature of electrically heated catalyst 18 occurs when the vehicle goes into a sustained deceleration or overrun operating condition. In either of these conditions the temperature of the exhaust gas cools down to a temperature which is often not sufficient to heat electrically heated catalyst 18 for the electrically heated catalyst to function properly.

In accordance with the method and system of the present invention, ISA controller 28 provides controlled electrical power from ISA 32 to catalyst heater 22 in order to heat electrically heated catalyst 18 during a deceleration or overrun condition of the vehicle, i.e., "overrun". Upon initiation of vehicle overrun, ISA inverter controller 28 first attempts to use electrical energy from ISA 32 to charge battery 26 and the system capacitors to adequate levels before supplying electrical energy to electrically heated catalyst 18. At the beginning of an overrun, electrically heated catalyst 18 has not had time to cool yet so heating is not initially necessary.

ISA inverter controller 28 then makes a determination as to when electrically heated catalyst 18 has cooled in temperature to where its conversion efficiency is unsatisfactory. ISA inverter controller 28 makes this determination by comparing the temperature signal generated from temperature sensor 24 with a predetermined operating temperature range for electrically heated catalyst 18. ISA inverter controller 28 may also make this determination by inferring the temperature of electrically heated catalyst 18 indirectly based on other available parameters such as suitable parameters obtained from ECM 30.

Once ISA inverter controller 28 determines that heating of electrically heated catalyst 18 is required, the ISA inverter controller provides catalyst heater 22 with controlled electrical power from ISA 32. In turn, catalyst heater 22 uses the controlled electrical power from ISA 32 to heat up electrically heated catalyst 18 in order for the electrically heated catalyst to function properly. At the end of the vehicle overrun condition and engine 12 has come under load again, ISA inverter controller 28 determines when the exhaust gas has enough heat to heat electrically heated catalyst 18. Upon determining that the exhaust gas has enough heat, ISA inverter controller 28 deactivates catalyst heater 22 from receiving electrical power from ISA 32. Another option is to use ECM 30 to sense the temperature of electrically heated catalyst 18 and control electrical power to catalyst heater 22.

The following are typical wattage ratings based on the inventors experience with system 10: catalyst heater 22 has a 1.6 kW rating, ISA 32 has a 6 to 20 kW (peak) rating, and the vehicle braking power dissipation can be on the order of 200 kW for two seconds during a 60 mph to 0 mph deceleration stop. From these values, a couple of inferences can be made. First, ISA 32 can be made with adequate power generating capacity to power catalyst heater 22. Second, energy dissipated by catalyst heater 22 makes only a minor contribution to the vehicle's braking. Thus, the effect of system 10 on braking dynamics is small.

In summary, the advantages associated with the present invention are that untreated hydrocarbons will not exit tailpipe 10 during an overrun condition due to electrical heated catalyst 18 becoming inefficient or inactive due to cool catalyst temperature. Untreated hydrocarbons will not accumulate in electrical heated catalyst 18 during an overrun condition with its associated risk of shortening catalyst life or destruction of the catalyst. Once the vehicle comes off of the overrun condition and comes under load again, electrically heated catalyst is immediately active and efficient. Thus, there will be no hydrocarbon emission spike as untreated hydrocarbons exit the tailpipe while the catalyst is being warmed back up by the exhaust gas.

The present invention does not require spark advance to be retarded as much during an overrun condition with its associated loss in combustion efficiency and increased fuel consumption. The present invention provides a convenient way to dissipate power generated by integral starter-alternator (ISA) 32 when it is being used to assist in vehicle braking and energy storage 26 (battery and capacitors) is fully charged and cannot accept all of the additional energy.

Thus it is apparent that there has been provided, in accordance with the present invention, a method and system for distributing electrical energy from an integrated starter-alternator during a deceleration or overrun condition to an electrically heated catalyst in order to maintain the temperature of the electrically heated catalyst within an operating temperature range. While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An exhaust system for a motor vehicle having an internal combustion engine, the exhaust system comprising:
an electrically heated catalyst operable for cleaning exhaust gas discharged by the internal combustion engine when the temperature of the electrically heated catalyst is in an operating temperature range;
a catalyst heater operable for converting electrical energy into heat;
an integral starter-alternator operable for converting mechanical energy generated by the internal combustion engine into electrical energy, wherein electrical energy from the integral starter-alternator is supplied to the catalyst heater during vehicle overrun, wherein the catalyst heater uses the electrical energy to heat the electrically heated catalyst in order to maintain the temperature of the electrically heated catalyst in the operating temperature range during vehicle overrun;
a temperature sensor operable for generating a temperature sensor signal indicative of the temperature of the electrically heated catalyst; and
a controller operable for processing the temperature signal to determine the temperature of the electrically heated catalyst, wherein the controller enables electrical energy from the integral starter-alternator to the catalyst heater after vehicle overrun initiates and the temperature signal indicates that the temperature of the electrically heated catalyst is below the operating temperature range.

2. The exhaust system of claim 1 further comprising:
a temperature sensor operable for generating a temperature sensor signal indicative of the temperature of the electrically heated catalyst; and
an integral starter-alternator controller operable for processing the temperature signal to determine the temperature of the electrically heated catalyst, wherein the integral starter-alternator controller enables electrical energy from the integral starter-alternator to the catalyst heater after vehicle overrun initiates and the temperature signal indicates that the temperature of the electrically heated catalyst is below the operating temperature range.

3. The exhaust system of claim 1 wherein:
the controller disables electrical energy from the integral starter-alternator to the catalyst heater after vehicle overrun terminates and the temperature signal indicates that the temperature of the electrically heated catalyst is in the operating temperature range.

4. A motor vehicle comprising:
an internal combustion engine operable for generating mechanical energy and discharging exhaust gas;
an electrically heated catalyst operable for cleaning exhaust gas discharged by the internal combustion engine when the temperature of the electrically heated catalyst is in an operating temperature range;
a catalyst heater operable for converting electrical energy into heat;
an integral starter-alternator operable for converting mechanical energy generated by the internal combustion engine into electrical energy, wherein electrical energy from the integral starter-alternator is supplied to the catalyst heater during vehicle overrun, wherein the catalyst heater uses the electrical energy to heat the electrically heated catalyst in order to maintain the temperature of the electrically heated catalyst in the operating temperature range during vehicle overrun;
a temperature sensor operable for generating a temperature sensor signal indicative of the temperature of the electrically heated catalyst; and
a controller operable for processing the temperature signal to determine the temperature of the electrically heated catalyst, wherein the controller enables electrical energy from the integral starter-alternator to the catalyst heater after vehicle overrun initiates and the temperature signal indicates that the temperature of the electrically heated catalyst is below the operating temperature range.

5. The motor vehicle of claim 4 further comprising:
a temperature sensor operable for generating a temperature sensor signal indicative of the temperature of the electrically heated catalyst; and
an integral starter-alternator controller operable for processing the temperature signal to determine the temperature of the electrically heated catalyst, where in the integral starter-alternator controller enables electrical energy from the integral starter-alternator to the catalyst heater after vehicle overrun initiates and the temperature signal indicates that the temperature of the electrically heated catalyst is below the operating temperature range.

6. The motor vehicle of claim 4 wherein:
the controller disables electrical energy from the integral starter-alternator to the catalyst heater after vehicle overrun terminates and the temperature signal indicates that the temperature of the electrically heated catalyst is in the operating temperature range.

7. A method for cleaning exhaust gas generated by an internal combustion engine of a motor vehicle during vehicle overrun, the method comprising:

cleaning exhaust gas discharged by the internal combustion engine with an electrically heated catalyst when the temperature of the electrically heated catalyst is in an operating temperature range;

using an integral starter-alternator to convert mechanical energy generated by the internal combustion engine into electrical energy;

converting the electrical energy from the integral starter-alternator into heat;

heating the electrically heated catalyst with the heat in order to maintain the temperature of the electrically heated catalyst in the operating temperature range during vehicle overrun, generating a temperature sensor signal indicative of the temperature of the electrically heated catalyst;

processing the temperature signal to determine the temperature of the electrically heated catalyst; and enabling electrical energy from the integral starter-alternator to be converted into heat after vehicle overrun initiates and the temperature of the electrically heated catalyst is below the operating temperature.

8. The method of claim 7 wherein:

converting the electrical energy from the integral starter-alternator into heat includes using a catalyst heater to convert the electrical energy from the integral starter-alternator into heat; and heating the electrically heated catalyst with the heat includes using the catalyst heater to heat the electrically heated catalyst with the heat.

9. The method of claim 7 further comprising:

generating a temperature sensor signal indicative of the temperature of the electrically heated catalyst;

processing the temperature signal to determine the temperature of the electrically heated catalyst; and enabling electrical energy from the integral starter-alternator to be converted into heat after vehicle overrun initiates and the temperature of the electrically heated catalyst is below the operating temperature.

10. The method of claim 7 further comprising:

disabling electrical energy from the integral starter-alternator to be converted into heat after vehicle overrun terminates and the temperature of the electrically heated catalyst is in the operating temperature range.

* * * * *